(12) United States Patent
Baskaran et al.

(10) Patent No.: US 10,789,055 B2
(45) Date of Patent: Sep. 29, 2020

(54) SYSTEMS AND METHODS FOR SCALABLE HIERARCHICAL POLYHEDRAL COMPILATION

(71) Applicant: Reservoir Labs, Inc., New York, NY (US)

(72) Inventors: Muthu Manikandan Baskaran, Old Tappan, NJ (US); Benoit J. Meister, New York, NY (US); Benoit Pradelle, Brooklyn, NY (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 15/285,810

(22) Filed: Oct. 5, 2016

(65) Prior Publication Data

US 2017/0097815 A1 Apr. 6, 2017

Related U.S. Application Data

(60) Provisional application No. 62/237,265, filed on Oct. 5, 2015.

(51) Int. Cl.
*G06F 8/41* (2018.01)
(52) U.S. Cl.
CPC .............. *G06F 8/4436* (2013.01); *G06F 8/41* (2013.01); *G06F 8/452* (2013.01)
(58) Field of Classification Search
None
See application file for complete search history.

(56) References Cited

U.S. PATENT DOCUMENTS

| 5,243,523 A * | 9/1993 | Stepper | B60K 31/047 180/176 |
| 2004/0015915 A1* | 1/2004 | Lam | G06F 8/4441 717/150 |
| 2008/0294882 A1* | 11/2008 | Jayapala | G06F 9/325 712/241 |
| 2009/0307673 A1* | 12/2009 | Eichenberger | G06F 8/452 717/160 |
| 2014/0165047 A1* | 6/2014 | Lethin | G06F 8/443 717/151 |

(Continued)

OTHER PUBLICATIONS

"Parametric Multi-Level Tiling of Imperfectly Nested Loops", Albert Hartono et al., ACM, Jun. 8, 2009.*

(Continued)

*Primary Examiner* — Daxin Wu
(74) *Attorney, Agent, or Firm* — Goodwin Procter LLP

(57) ABSTRACT

A system for compiling programs for execution thereof using a hierarchical processing system having two or more levels of memory hierarchy can perform memory-level-specific optimizations, without exceeding a specified maximum compilation time. To this end, the compiler system employs a polyhedral model and limits the dimensions of a polyhedral program representation that is processed by the compiler at each level using a focalization operator that temporarily reduces one or more dimensions of the polyhedral representation. Semantic correctness is provided via a defocalization operator that can restore all polyhedral dimensions that had been temporarily removed.

22 Claims, 6 Drawing Sheets

(56) References Cited

U.S. PATENT DOCUMENTS

2015/0277877 A1* 10/2015 Feng .................. G06F 8/443
717/155
2016/0110171 A1* 4/2016 Bikshandi ............. G06F 7/4806
717/160

OTHER PUBLICATIONS

"Compiler-Assisted Dynamic Scheduling for Effective Parallelization of Loop Nests on Multicore Processors", Muthu Manikandan Baskaran et al., ACM, Feb. 14, 2009.*

Roberto Bagnara, Patricia M. Hill, and Enea Zaffanella, "Weakly-relational shapes for numeric abstractions: Improved algorithms and proofs of correctness," Form. Methods Syst. Des., 35(3):279-323, Dec. 2009.

Dennis Gannon, William Jalby, and Kyle Gallivan, "Strategies for cache and local memory management by global program transformation," J. Parallel Distrib. Comput., 5(5):587-616, Oct. 1988.

M. Jimenez, J.M. Llaberia, and A. Fernandez "A cost-effective implementation of multilevel tiling," Parallel and Distributed Systems, IEEE Transactions on, 14(10):1006-1020, Oct 2003.

DaeGon Kim, Lakshminarayanan Renganarayanan, Dave Rostron, Sanjay V. Rajopadhye, and Michelle Mills Strout, "Multi-level tiling: M for the price of one," in Proceedings of Super Computing (SC-07), p. 51, 2007.

Antoine Mine, "A new numerical abstract domain based on difference-bound Matrices," in Proceedings of the Second Symposium on Programs As Data Objects, PADO '01, pp. 155-172, London, UK, UK, 2001. Springer-Verlag.

Antoine Mine, "The octagon abstract domain," Higher Order Symbol. Comput., 19(1):31-100, Mar. 2006.

Axel Simon, Andy King, and Jacob M Howe, "Two variables per linear inequality as an abstract domain," in Logic Based Program Synthesis and Transformation, pp. 71-89. Springer, 2003.

Ran Shaham, Elliot K. Kolodner, and Shmuel Sagiv, "Automatic removal of array memory leaks in java," in Proceedings of the 9th International Conference on Compiler Construction, CC '00, pp. 50-66, London, UK, UK, 2000. Springer-Verlag.

Ramakrishna Upadrasta and Albert Cohen, "A case for strongly polynomial time sub-polyhedral scheduling using two-variable-per-inequality polyhedra," in IMPACT 2012, 2nd International Workshop on Polyhedral Compilation Techniques, 2012.

Ramakrishna Upadrasta and Albert Cohen, "Sub-polyhedral scheduling using (unit-)two-variable-per-inequality polyhedra," in The 40th Annual ACM SIGPLAN-SIGACT Symposium on Principles of Programming Languages, POPL '13, Rome, Italy—Jan. 23-25, 2013, pp. 483-496, 2013.

* cited by examiner

SYSTEMS AND METHODS FOR SCALABLE HIERARCHICAL POLYHEDRAL COMPILATION

CROSS-REFERENCE TO RELATED PATENT APPLICATIONS

This application claims benefit of priority to U.S. Provisional Patent Application Ser. No. 62/237,265 entitled "Systems and Methods for Scalable Hierarchical Polyhedral Compilation," filed on Oct. 5, 2015, the contents of which are incorporated herein by reference in their entirety.

STATEMENT OF GOVERNMENT SUPPORT

This invention was made with government support under Contract No. HR0011-12-C-0123 awarded by Defense Advanced Research Projects Agency. The government has certain rights in the invention.

FIELD OF THE INVENTION

This disclosure generally relates to compilation techniques for high performance processing systems and, in particular, to polyhedral compilation techniques for targeting multi-level hierarchical processors and memories.

BACKGROUND

The ever-increasing need for higher performance and the recent concern about energy consumption has put a lot of pressure on hardware manufacturers to increase parallelism. A consequence of the increased level of parallelism in computers is the creation of hierarchies of processing units and memories. It seems indeed simpler to build efficient parallel computers when they are designed as a flexible hierarchy of processing units and memory units. The various optimization problems that otherwise may become computationally so complex due to the system scale, that it would take too long (e.g., hours, days, etc.) to solve them or may not be solvable at all, can then be solved as sub-problems that are independent from each other at different levels of the processor and/or memory hierarchy. Interestingly, this trend likely holds for different architectures: the expected computer design for exascale machines may lean more and more towards deep hierarchies while, in the general-purpose computing environment, a chip manufacturer has recently introduced a fourth level of cache in some of its processor chips. Deeper hierarchies, especially memory hierarchies, are becoming more and more prominent, but many compilers do not particularly account for memory hierarchies.

The polyhedral compilation model provides powerful tools and representations to optimize statically analyzable programs for hierarchical platforms. Within the polyhedral model, programs can be automatically parallelized, specific memory levels can be targeted, e.g., through tiling, and explicit communications between the various levels of memory hierarchies can be automatically generated, among other powerful optimizations. The significant performance improvements provided by polyhedral compilation have been reported. However, the model and its associated techniques are also known to become exponentially slower as the dimensionality of the considered polyhedra increases. This is an important concern for deep memory hierarchies because often multi-level tiling is required to properly exploit every memory level while each level of tiling generally adds new dimensions to polyhedral, and adding a new dimension significantly slows the task of compilation.

One technique to address the compiler complexity issues when deep hierarchies are considered involves using optimization/compilation techniques other than those based on the polyhedral model. These other compilation techniques, however, tend to be much less powerful than the general polyhedral model. For instance, syntactic tiling allows loop tiling to be performed with a low computational complexity but cannot be combined with several other desirable optimizations available in the polyhedral model.

The polyhedral model and its usage in compilers, on the other hand, provide a coherent framework in which programs can be efficiently represented, analyzed, and optimized. This framework has been implemented in several commercial compilers such as GCC™, LLVM™, and the R-Stream™ compiler. The efficiency of polyhedral compilers is therefore an important aspect of many compilers.

The computational complexity is one of the major challenges induced by the polyhedral compilation. Various directions have been investigated and different methods have been proposed to enhance the scalability of polyhedral compilers. The various proposed solutions focus on different aspects of the polyhedral representation and are often complementary. First, several techniques restrict the set of constraints allowed to define polyhedra. Several variants of the same techniques exist, each one restricting differently the form of the constraints that can be handled. For instance, Difference Bound Matrices (DBM) only allows constraints in the form $x_i - x_j \leq k$, $x_i \geq 0$, $x_j \geq 0$. Other representations allow more complex constraints such as Unit Two Variables Per Inequality (UTVPI), or Two Variables Per Inequality, for instance. The general idea is to restrict the form of the constraints in order to use specialized algorithms to handle the polyhedra, usually with strong worst-case complexity guarantees.

Second, a technique was recently proposed to overapproximate a sequence of statements as a single element called o-molecule. This approach can reduce the number of statements considered in a program, which may improve the complexity of several polyhedral operations performed during compilation. Another technique suggests directions to improve the implementation of the scheduling step. For example, a modular approach to scheduling is presented. The modularity is defined similarly as the o-molecules but prevents some global optimizations to be performed on the program.

Some other systems exploit parametric tiling to optimize programs in the presence of complex memory hierarchies. Parametric tiling is more flexible than constant-size tiling but it does not readily fit in the polyhedral model, so parametric tiling is often applied in post-processing compiler passes. Thus, once the program is parametrically tiled, it cannot anymore be modified and optimized further. As a consequence, key optimizations which benefit from tiling such as automatic communication generation cannot be performed by the compiler based on the polyhedral representation of the program.

SUMMARY

Various embodiments described herein allow compilers to benefit from the powerful optimizations of the polyhedral model when targeting deep memory hierarchies, by addressing the compiler complexity and scalability limitations. Specifically, we describe two new operators to improve the scalability of the polyhedral compilation framework: a focalisation operator and an associated defocalisation operator. The operators can effectively control the number of dimensions in the important polyhedra used in the polyhedral representation. The operators can be integrated into a general compilation flow for hierarchical hardware where different memory levels can be optimized one after the other. Within that flow, the focalisation and defocalisation operators may be applied to the program representation every time a particular level of the hardware/memory hierarchy is targeted. The focalization operator can decrease the total number of dimensions processed by a polyhedral compiler and, as a result, the complexity of the optimization tradeoffs performed during the compilation can be reduced.

Accordingly, in one aspect, a method is provided for optimizing execution of a program by a processing system having a hierarchical memory having several memory levels. The method includes: (a) for each memory level in at least a subset of memory levels in the several memory levels, focalizing a loop dimension of a selected loop nest within a program, and (b) for each focalized dimension, defocalizing that dimension. The step of focalizing includes: removing an iterator corresponding to a loop index associated with the loop dimension being focalized, and either or both of: (i) removing from a loop condition at another loop dimension of the selected loop nest a subcondition corresponding to the loop index; and (ii) removing from a memory access expression of an operand, a reference to the loop index associated with the loop dimension being focalized. The step of focalizing also includes storing the loop index and associated focalization information for that memory level. Defocalizing a dimension includes adding an iterator based on a reintroduced loop index associated with the loop dimension being defocalized, and either or both of: (i) updating a loop condition at another loop dimension of the selected loop nest based on the stored focalization information associated with the loop dimension being defocalized; and (ii) updating the memory access expression of the operand based on the reintroduced loop index and the stored focalization information.

In some embodiments, the method further includes at least one of: (i) tiling the selected loop nest, and (ii) strip mining the selected loop nest, to optimize memory access associated with an operand accessed within the selected loop nest, at that memory level. The focalization information may include one or more loop bounds and one or more tile sizes. A first dimension may be focalized at a first memory level, and a second dimension different from the first dimension may be focalized at a second memory level. In some embodiments, a first dimension is focalized at a first memory level, and the first dimension is also focalized at a second memory level. A first tile size may be associated with the first dimension at the first memory level, and a second tile size different from the first tile size may be associated with first dimension at the second memory level. The loop dimension being focalized may be the outer-most dimension of the selected loop nest, and/or a dimension in which memory accesses are piecewise uniformly generated references (PUGRs) or uniformly generated references (UGRs).

In some embodiments, the method includes performing for at least one memory level at least one loop-nest transformation prior to the focalizing step. The loop-nest transformation may include one or more of: loop fission, loop fusion, loop interchange, loop unroll, loop jam and unroll, loop reversal, strip mining, and loop tiling. A characteristic of memory at a first memory level may be different from the characteristic of memory at a second memory level. The memory characteristic can be memory size, memory speed, and/or memory power consumption.

The method may include determining that all memory access within a candidate loop nest are PUGRs or UGRs, and selecting the candidate loop nest as the selected loop nest. The method may also include generating a set of schedule constraints prior to performing the focalizing step, and testing a violation of the schedule constraints after at least one defocalization step.

In another aspect, a system is provided for facilitating optimized execution of a program by a processing system comprising a hierarchical memory having several memory levels. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a) for each memory level in at least a subset of memory levels in the several memory levels, focalize a loop dimension of a selected loop nest within a program, and (b) for each focalized dimension, defocalize that dimension.

To focalize a dimension, the instructions program the processing unit to: remove an iterator corresponding to a loop index associated with the loop dimension being focalized, and to: (i) remove from a loop condition at another loop dimension of the selected loop nest a subcondition corresponding to the loop index; and/or (ii) remove from a memory access expression of an operand, a reference to the loop index associated with the loop dimension being focalized. The instructions also program the processing unit to: store the loop index and associated focalization information for that memory level.

To defocalize a dimension, the instructions program the processing unit to add an iterator based on a reintroduced loop index associated with the loop dimension being defocalized. In addition, the instructions program the processing unit to: (i) update a loop condition at another loop dimension of the selected loop nest based on the stored focalization information associated with the loop dimension being defocalized; and/or (ii) update the memory access expression of the operand based on the reintroduced loop index and the stored focalization information. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to facilitate optimized execution of a program by a processing system comprising a hierarchical memory having several memory levels. The instructions program the processing unit to: (a) for each memory level in at least a subset of memory levels in the several memory levels, focalize a loop dimension of a selected loop nest within a program, and (b) for each focalized dimension, defocalize that dimension.

To focalize a dimension, the instructions program the processing unit to: remove an iterator corresponding to a loop index associated with the loop dimension being focalized, and to: (i) remove from a loop condition at another loop dimension of the selected loop nest a subcondition corresponding to the loop index; and/or (ii) remove from a memory access expression of an operand, a reference to the loop index associated with the loop dimension being focalized. The instructions also program the processing unit to: store the loop index and associated focalization information for that memory level.

To defocalize a dimension, the instructions program the processing unit to add an iterator based on a reintroduced loop index associated with the loop dimension being defocalized. In addition, the instructions program the processing unit to: (i) update a loop condition at another loop dimension of the selected loop nest based on the stored focalization information associated with the loop dimension being defocalized; and/or (ii) update the memory access expression of the operand based on the reintroduced loop index and the stored focalization information. In various embodiments, the instructions can program the processing unit to perform one or more of the method steps described above.

BRIEF DESCRIPTION OF THE DRAWINGS

In the following description, various embodiments of the present invention are described with reference to the following drawings, in which.

DETAILED DESCRIPTION

General Notations

Figure 1:
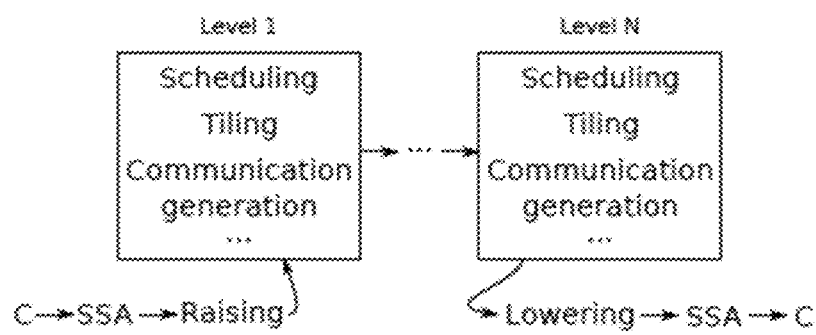
FIG. 1 schematically depicts a sequential compilation flow using a polyhedral compiler targeting a multi-level processing system for executing a compiled program, according to some embodiments.

We denote vectors using lowercase letters and the arrow notation, such as with $\vec{v}$. Vectors can also be decomposed into their different components using parenthesis: $\vec{v}=(v_1, \ldots, v_n)$. Moreover, vectors and values can be concatenated using the operator $\langle \ \rangle$. For instance, $\langle 1, (2,3) \rangle = (1,2,3)$ and $\langle \vec{u}, \vec{v} \rangle = (u_1, \ldots, u_n, v_1, \ldots, v_m)$. The context can determine whether vectors are in row or column format.

Matrices are named using an uppercase letter. $M_{i,j}$ designates the element at row i and column j in the matrix M. Polyhedra are defined as the intersection of linear inequalities and are named using stylized capital letters, such as P. Accolades designate an intersection of constraints and we interchangeably consider a polyhedron or the set of constraints that defines it.

We define a projection operation over polyhedra using the classical definition. We call $\Pi_1$ the operator projecting away the outermost dimension of a polyhedron. The operator is defined as follows.

$$\Pi_1(P)=\{\vec{y}\,|\,\exists x, \langle x, \vec{y} \rangle \in P\}$$

We also define an extension operator $E_1$, that extends a polyhedron by an unbounded outermost dimension. In some sense, the extension operation is the opposite of the projection operation defined earlier. The extension is defined as follows.

$$E_1(P)=\{\langle x, \vec{y} \rangle \,|\, \forall x \in \mathbb{Z}, \vec{y} \in P\}$$

One can notice that $\Pi_1(E_1(P))=P$, but $E_1(\Pi_1(P)) \supseteq P$. Moreover, note that an extended empty polyhedron remains empty: $E_1(\emptyset)=\emptyset$.

Polyhedral Model

The polyhedral model provides a coherent framework to efficiently represent loop nests in programs. Specifically, it enables the representation of program regions with statically analyzable control flow and memory accesses. As such, it is mostly targeted at loop nests where loop bounds, tests, and memory access functions are affine functions of the surrounding loop indices and constant parameters. Advanced loop transformations and optimizations are performed within the polyhedral model in a consistent fashion. In particular, every combination of loop fission, fusion, skewing, and interchange can be performed in the polyhedral model, among other optimizations.

In the polyhedral model, the program instructions define polyhedral statements. The statements in a program can be executed multiple times when they are enclosed in loops. In that case, the polyhedral model allows the various instances of the statement to be distinguished. The set of instances of a statement define its iteration domain, which is a polyhedron defined by the set of all the constraints that apply to the statement. In particular, the bounds of the loops enclosing the statement are intersected to form its iteration domain. The instances of the statement are then the points at integer coordinates in the polyhedron. For example, a statement S enclosed in two nested loops iterating from 0 to a constant N, has an iteration domain $D_S$ defined as:

$$D_S=\{(i,j) \in \mathbb{Z}^2 \,|\, 0 \leq i \leq N \wedge 0 \leq j \leq N\}$$

In iteration domains, the points at integer coordinates represent the statement instances. The coordinates of instances can be expressed as integer vectors and represent the value of the loop indices when the statement instance is run. Such coordinate vectors are called iteration vectors. In the previous example, the valid iteration vectors are defined by $\vec{s} \in D_S$.

The programs described in the polyhedral model usually expose data dependences. Two statements S and T are dependent on each other if they both access the same memory location during the program execution and if at least one of the two accesses is a write. The dependence between the two statements is classically noted $\delta_{S,T}$ where S is considered to be the source of the dependence and T the destination if S is executed before T in the original program. As a special case, S and T can refer to the same statement in which case the dependence source and destination are two instances of a unique statement.

Dependences between two statements are also represented by convex polyhedra in the polyhedral model. When considering a dependence $\delta_{S,T}$, the associated dependence polyhedron precisely characterizes the instances of S and T that are accessing the same memory location, provoking the dependence. Dependence polyhedra are defined as a subset of the Cartesian product of all the statement instances. In general, dependence polyhedra combine at least three types of constraints:

Validity: the dependent source and target statement instances must be within their respective iteration domains;

Precedence: the dependence source must run before the target;

Intersection: the represented instances only participate in the dependence if they are accessing the same memory location.

As an example, a typical dependence polyhedra for a dependence $\delta_{S,T}$, can be defined by the following constraints.

$$\Delta_{S,T} = \begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \end{cases}$$

where $\prec$ is the lexicographic precedence, defined by $(a_1, \ldots, a_n) \prec (b_1, \ldots, b_m) \Leftrightarrow \exists i \leq \min(n, m) \land (a_1, \ldots, a_{i-1}) = (b_1, \ldots, b_{i-1}) \land a_i < b_i$. In our notation, $fs$ and $fT$ are the affine functions used respectively in the conflicting memory references of S and T.

In the polyhedral model, the loop transformations are represented as multidimensional affine schedules. A schedule is a transformation of the order in which the statement instances must be executed. When considering a statement S enclosed in d loops within a program expressed in terms of the parameters $\vec{p}$, the statement's m-dimensional schedule is an affine function $\Theta_S$ defined such that:

$$\Theta_S(\vec{s}) = \begin{pmatrix} \theta_{1,1} & \cdots & \theta_{1,d+p+1} \\ \vdots & \ddots & \vdots \\ \theta_{m,1} & \cdots & \theta_{m,d+p+1} \end{pmatrix} \begin{pmatrix} \vec{s} \\ \vec{p} \\ 1 \end{pmatrix}$$

with $p = |\vec{p}|$, i.e. the number of parameters. The scheduling function $\Theta_S$ defines a new ordering for the instances of S: in the transformed space, the instances of S are expected to be executed in the lexicographic order of the iteration vectors in $\{\Theta_S(\vec{s}) | \vec{s} \in D_S\}$. In this context, a program transformation can be expressed as a schedule for every statement in the program.

Not all the schedules lead to an execution order that preserves the original program semantics. A schedule, or transformation, is said legal if it maintains the relative ordering of all the dependent statement instances. In particular, for every dependence $\delta_{S,T}$, a schedule is valid if it enforces the following condition:

$$\Theta_S(\vec{s}) \prec \Theta_T(\vec{t})$$

A legal transformation can be provided by any of the known scheduling methods.

Polyhedral Compilation Flow

A typical polyhedral compilation flow is structured as follows. At first, the program source code is parsed into an equivalent polyhedral representation. Then, the dependence analysis phase detects all the dependent statements pairs in the program and builds all the corresponding dependence polyhedra. Once the all the dependences in the program are computed, a legal transformation, or schedule, is computed for the program. Usually, an integer linear programming (ILP) solver is used to determine the optimal transformation to apply on the statements in order to maximize various metrics such as the memory locality or the parallelism. Once the scheduling is done, additional transformations may be applied on the program. It is for instance typical to tile the program loop nests, determine an efficient memory assignment for the various variables, and generate explicit communications at this phase. Finally, the polyhedral representation is transformed back into a lower representation and the transformed program can be generated.

The typical compilation flow can be adapted to target deep hierarchies in different ways. One approach to perform compilation of a program when the target architecture has several levels of memory forming a memory hierarchy is to optimize the program for all the memory levels at once. Because the overall memory architecture is considered, this would allow for highly accurate optimizations to be performed. On the other hand, this approach typically does not scale beyond one or two memory levels in polyhedral compilers. Another approach is to target the memory levels sequentially. As optimizations are performed for a certain memory level, the depth of one or more loop nests in the program can increase. This can increase the computation complexity of the optimizations to be performed at the next memory level significantly, e.g., by an order of magnitude or even more. In some cases, the depth of a loop nest in the original program may be large enough, e.g., a depth of 4, 7, 8, or more, so that the computation complexity of the optimizations to be performed at one or more memory levels can be excessive, requiring hours or even days of compilation time.

We describe various embodiments that feature an iterative/sequential approach where every architecture level is successively targeted, as illustrated in FIG. 1. In our approach, a different optimization problem is solved specifically for every considered level, according to one or more hardware characteristics of the considered level. The hardware characteristic can be size/capacity, speed/bandwidth/bitwidth, type, number of read ports, number of write ports, and/or power consumption of the memory at a particular level, and/or processor speed and/or capacity. The size of the memory may include the size of an individual memory unit and/or the collective size of two or more of the memory units at that level. Speed of the memory unit may include a rate at which data elements can be access sequentially and/or a time required for exchange of a unit of data between a processor and the memory.

To minimize the increase in computation complexity due to increase in the depth(s) of one or more loop nests, or to avoid having to optimize a loop nest having a depth so large that the optimization would take too long (e.g., several minutes, or hours, or more), our iterative or sequential compilation flow is combined with the focalisation and defocalisation operators described herein. As a consequence, optimizations targeted specifically for each memory level, based on one or more properties of the memory at that level can be performed without having to analyze loop nest(s) that are so deep that the computation complexity and the required compile time becomes excessive (e.g., more than a few minutes, hours, etc.). As such, the iterative/sequential compilation flow, combined with the focalisation and defocalisation operators, can make it feasible to target deeply hierarchical hardware architectures that were generally considered to be out of reach previously for a polyhedral compiler.

Overview of Focalization and Defocalization

We describe various embodiments to simplify the polyhedra used to represent and transform programs in compilers. The general strategy employed includes focusing the representation on the dimension(s) identified as more important in the polyhedron, ignoring the other less important dimensions. The typical sequence of compiler optimizations may then applied on the simplified polyhedra in order to transform and optimize the program more efficiently. Finally, a defocalisation phase recovers the initial program semantics while carrying over the transformations previously applied on the program. As a consequence, some of the most expensive passes of polyhedral compilation may be performed using the simpler polyhedra, leading to faster compilation and improved compiler scalability.

Figure 2A:
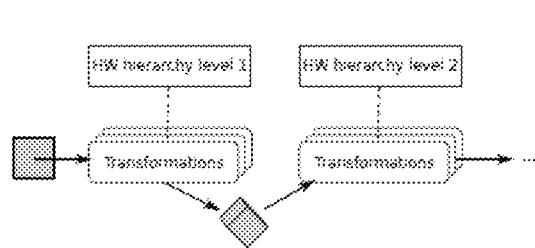
FIGS. 2A and 2B schematically depict a sequential compilation for different levels of hierarchy, without and with the focalization step according to some embodiments, respectively.
Figure 2B:
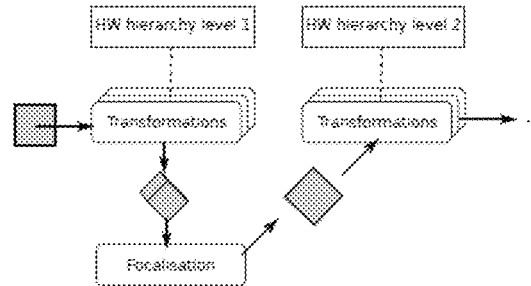

FIG. 2A illustrates a compilation flow in which polyhedra as modified by the optimization(s) performed at a particular level of hardware hierarchy are passed on to the next level. We integrate the focalisation and defocalisation phases within the general compilation flow presented in FIGS. 1 and 2A. First, we decompose the general compilation flow for a hierarchical hardware target into a sequence of optimizations. At each step, a different level of the hardware hierarchy is considered. In particular, various optimizations applied and the parameters used are specialized for that specific level. Then, the focalisation is performed as soon as a hierarchy level has been fully processed, as shown in FIG. 2B, so as to reduce the dimensionality of the polyhedra to be processed by the next level. One benefit from such compilation flow is its scalability. This is because focalisation allows one or more of the loop dimensions that were newly introduced during the optimizations performed, and/or one or more original loop dimensions to be ignored during compilation/optimization at the next hierarchy level, thus allowing the computational complexity at any hardware level not to exceed a specified limit.

In some cases, focalization can be performed at the first or subsequent hierarchy levels to ignore one or more of the originally specified dimensions even before other optimizations are applied, so that the original depth(s) of one or more loop nest(s) can be decreased prior to performing other compiler optimizations. As such, the compilation flow can be scaled to arbitrarily deep hardware hierarchies, such as those having 2, 3, 5, 7, or more memory/processing levels.

The improved compiler scalability has certain costs associated with it. In fact, because some polyhedra dimensions are hidden to compiler optimizations, they cannot be involved in the transformations applied after the focalisation. For instance, it is not possible to perform a loop interchange with one of the hidden dimensions. Thus, the dimensions involved in the focalisation have to be carefully chosen to maintain a good balance between the polyhedra complexity and the relevance of the remaining optimizations.

Different heuristics and criteria can be used to determine which dimensions in polyhedra are of lesser importance and should be removed in the focalised representation. For instance, in some embodiments parallel dimensions are targeted in order to preserve them from being further transformed, causing potential loss of some parallelism. In some embodiments, the inter-tile dimensions can be targeted when considering hierarchical memory models. When tiling is applied, the inter-tile loops are generally semantically associated with the higher memory level, while intra-tile loops are associated to lower memory levels. As such, when the compiler focuses on lower memory levels, it may largely consider the intra-tile loops and is less likely to involve the inter-tile dimensions in new transformations. Therefore, the inter-tile dimensions are, in some embodiments, good candidates for being hidden using focalisation from the optimization at the lower memory level(s).

Focalisation and Defocalisation

The computation of a new schedule, or scheduling, determines the transformations and optimizations applied to a program. It is one of the core operations performed during the program compilation. The scheduling is also among the most computationally expensive compilation phases. Therefore, in various embodiments focalisation is performed to benefit the scheduling pass. The scheduling pass generally depends on the dependence polyhedra, which define the legality of the generated schedule. As such, we define the focalisation operator a as a transformation of the dependence polyhedra. Its input is a dependence polyhedron $\Delta_{S,T}$, resulting from dependence analysis, and its output is a simpler dependence polyhedron $\Delta_{\tilde{S},T}$, of lower dimensionality:

$$\alpha(\Delta_{S,T}) = \Delta_{\tilde{S},T}$$

In the polyhedral model, many of the transformations applied to a program can be encoded in a program schedule. However, after focalisation has been applied, a new program schedule $\Theta_{\tilde{S}}$ is computed using the focalized program representation, which is not directly relevant to the original program. The goal of the defocalisation operator is to transform the schedule so that it can be applied on the original program representation with the additional constraint that all the transformations defined by the schedule $\Theta_{\tilde{S}}$ must be carried through the defocalisation. Therefore, we define a defocalisation operator p as a transformation performed on schedules. The operator takes the schedule $\Theta_{\tilde{S}}$ as an input and converts it into a schedule $\Theta_S$. Finally, the resulting schedules $\Theta_S$ are applied on the original program representation. The defocalisation operator is then defined as:

$$\rho(\Theta_{\tilde{S}}) = \Theta_S$$

The focalization-defocalization process can be fully defined as a tuple $(\alpha, \rho)$ where $\alpha$ is the focalisation operator and $\rho$ is the defocalisation operator applied on the program. Several operators can be used to perform these two operations. We present two focalisation operators with different properties and a common defocalisation operator in the following sections. We also demonstrate that the focalisation processes they define preserve the original program semantics.

Focalisation Operator

We introduce a focalisation operator whose goal is to remove the inter-tile dimensions from the dependence polyhedra. The intuition behind selecting the inter-tile dimensions is that they relate to an optimization related to a particular memory level that has already been performed by the compiler, unlike the intra-tile dimensions. For this focalisation operator, the compiler can identify the inter-tile dimensions in the program. Usually, the compiler itself generates them, e.g., while performing a tiling optimization. In order to simplify the discussion, we define a sub-operator $\breve{\alpha}$ which removes the outermost dimension of the iteration domain(s) used in dependence polyhedra. The sub-operator can be applied to any non-outermost dimension, as well, and $\breve{\alpha}$ can be repeatedly applied, eliminating the inter-tile dimensions one at a time. Such repeated application can describe the full focalisation operator $\alpha$.

Based on the dependence polyhedron formulation, we define the focalisation operator $\breve{\alpha}$ as:

$$\breve{\alpha}(\Delta_{S,T}) = \begin{cases} \vec{s'} \in \Pi_1(\mathcal{D}_S) \\ \vec{t'} \in \Pi_1(\mathcal{D}_T) \\ \vec{s'} \prec \vec{t'} \\ \phi_1(f_S)(\vec{s'}) = \phi_1(f_T)(\vec{t'}) \end{cases}$$

where $\phi_1$ removes any reference to the outermost dimension in a memory access function.

The focalisation operator exploits the projection operation, which is typically computationally expensive. The complexity of the projection can be an issue in some pathological cases and may prevent the focalisation from being applied. In our experiments, we did not encounter such cases and the benefit of the focalisation generally prevailed over the cost of the operator.

Defocalisation Operator

In order to exploit the schedules computed using the focalised program representation, we associate the focalisation operator to a defocalisation operator $\rho$. As previously, we simplify the notations by defining a sub-operator $\breve{\rho}$, which can be repeatedly applied to the schedule computed from the focalised program representation. Every application of the operator $\breve{\rho}$ re-introduces the outermost dimension that was projected away by the last application of $\breve{\alpha}$. The operator $\breve{\rho}$ can be applied, however, to reintroduce any non-outermost dimension, as well. The operator is defined as follows:

$$\Theta_S = \breve{\rho}(\Theta_{\breve{S}}) = \begin{pmatrix} 1 & 0 & \cdots & 0 \\ 0 & & & \\ \vdots & & \Theta_{\breve{S}} & \\ 0 & & & \end{pmatrix}$$

Intuitively, the defocalisation re-introduces an outermost loop and leaves it in its original state: it is not transformed nor combined with any other dimension. The defocalisation process is syntactic and has a negligible overhead if a matrix representation of the schedule is used by the compiler. It can be repeated as many times as the program has been focalised in order to recover a schedule of the same dimension as the original program semantics. Finally, the defocalised schedule is applied to the original program representation to replay the transformation computed based on the focalised program representation. The computational cost of rescheduling and, hence, the defocalization operation is generally insignificant.

Legality

We defined earlier the focalisation and defocalisation operators as the repetition of two sub-operators $\breve{\alpha}$ and $\breve{\rho}$. It is crucial that the focalisation and defocalisation, achieved by the repetitive application of the sub-operators, preserve the original program semantics. In other words, a schedule computed from the focalised program representation and defocalised afterwards must be legal with regard to all the dependences in the original program.

A schedule $\Theta$ can be said to be legal if it is legal with regard to every dependence in the original program. A schedule is legal with regard to a dependence if it never leads to execution of the source statement S of the dependence after the target T of the dependence. Thus, when considering any dependence $\delta_{S,T}$, the schedule $\Theta$ is legal if there is no solution to the following set of constraints:

$$\begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \\ \Theta_S(\vec{s}) \succ \Theta_T(\vec{t}) \end{cases}$$

This set of constraints define all the couples of iteration vectors such that S runs after T in the transformed program, despite the order imposed by $\delta_{S,T}$. When the schedule $\Theta$ results from the defocalisation of another schedule, $\Theta\sim$, computed on the focalised program representation, the constraints can then be rewritten into the following equivalent set:

$$\begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \\ \breve{\rho}(\Theta_{\breve{s}})(\vec{s}) \succ \breve{\rho}(\Theta_{\breve{t}})(\vec{t}) \end{cases}$$

This constraint set must be proved empty for the schedule $\Theta$ to be valid with regard to $\delta_{S,T}$.

We expand the defocalisation operator $\breve{\rho}$ using its definition:

$$\begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \\ \langle s_1, \Theta_{\breve{s}}((s_2, \ldots, s_n)) \rangle \succ \langle t_1, \Theta_{\breve{t}}((t_2, \ldots, t_m)) \rangle \end{cases}$$

We also expand the two lexicographic precedence relations in the constraints according to the definition of the relation. The relations $\vec{s} \prec \vec{t}$ is expanded into either $$\begin{cases} s_1 = t_1 \\ \vec{s} \prec \vec{t} \end{cases}$$

or $$s_1 < t_1$$

Similarly, the relation $$\langle s_1, \Theta_{\breve{s}}((s_2, \ldots, s_n)) \rangle \succ \langle t_1, \Theta_{\breve{t}}((t_2, \ldots, t_m)) \rangle$$

is expanded into either $$\begin{cases} s_1 = t_1 \\ \Theta_{\breve{s}}((s_2, \ldots, s_n)) \succ \Theta_{\breve{t}}((t_2, \ldots, t_m)) \end{cases} \text{ or }$$

$$s_1 > t_1$$

One can notice that the ordering of $s_1$ and $t_1$ is always contradicting when the lexicographic relations are expanded, except for the case where $s_1 = t_1$ in both relations. Thus, the schedule $\Theta$ is legal with regard to a dependence $\delta_{S,T}$ if the following set of constraints, referred to as the polyhedron 1, is empty.

$$\begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \\ s_1 = t_1 \\ \Theta_{\tilde{S}}((s_2, \ldots, s_n)) \succ \Theta_{\tilde{T}}((t_2, \ldots, t_m)) \end{cases} \quad (1)$$

We now restrict the set of considered memory references to Piecewise Uniformly Generated References (PUGRs). We define PUGRs as a natural generalization of the Uniformly Generated References (UGRs): while two memory references are said to be uniformly generated if they only differ by a constant, we call them piecewise uniformly generated along a dimension i if they refer to the dimension i using the same coefficient. Notice that, if two references are UGRs, they are PUGRs along all the dimensions. For instance A[i] and A[i+2] are uniformly generated and PUGRs along i, but A[i+j] and A[i+2j+1] are only piecewise uniformly generated along the dimension i. Although they do not cover all the valid memory references, PUGRs are common among the memory accesses in various programs. Moreover, we later present a more general focalisation operator, valid for every kind of memory references.

We assume that the schedules $\Theta_{\tilde{S}}$ and $\Theta_{\tilde{T}}$ are legal with regard to the program representation focalised using $\check{\alpha}$. In other words, we assume that the scheduling method used in compiler produces legal schedules. Then, the following set of constraints is necessarily empty.

$$\begin{cases} \vec{s'} \in \Pi_1(\mathcal{D}_S) \\ \vec{t'} \in \Pi_1(\mathcal{D}_T) \\ \vec{s'} \prec \vec{t'} \\ \phi_1(f_S)(\vec{s'}) = \phi_1(f_T)(\vec{t'}) \\ \Theta_{\tilde{S}}(\vec{s'}) \succ \Theta_{\tilde{T}}(\vec{t'}) \end{cases}$$

The preceding constraints can be extended as follows, while preserving the vacuity of the represented polyhedron.

$$\begin{cases} \vec{s} \in E_1(\Pi_1(\mathcal{D}_S)) \\ \vec{t} \in E_1(\Pi_1(\mathcal{D}_T)) \\ (s_2, \ldots, s_n) \prec (t_2, \ldots, t_m) \\ \phi_1(f_S)((s_2, \ldots, s_n)) = \phi_1(f_T)((t_2, \ldots, t_m)) \\ \Theta_{\tilde{S}}((s_2, \ldots, s_n)) \succ \Theta_{\tilde{T}}((t_2, \ldots, t_m)) \end{cases}$$

Additional constraints cannot transform an empty polyhedron into a non-empty one. Therefore, the following set of constraints also defines an empty polyhedron:

$$\begin{cases} \vec{s} \in E_1(\Pi_1(\mathcal{D}_S)) \\ \vec{t} \in E_1(\Pi_1(\mathcal{D}_T)) \\ \vec{s} \prec \vec{t} \\ s_1 = t_1 \\ \phi_1(f_S)((s_2, \ldots, s_n)) = \phi_1(f_T)((t_2, \ldots, t_m)) \\ \Theta_{\tilde{S}}((s_2, \ldots, s_n)) \succ \Theta_{\tilde{T}}((t_2, \ldots, t_m)) \end{cases}$$

When the considered memory references are PUGRs along the outermost dimension, having $s_1 = t_1$ leads any reference to the outermost dimension to be canceled in the equality $f_S(\vec{s}) = f_T(\vec{t})$, when focalization of the outermost dimension is performed. As a result, the previous set of constraints is equivalent to the following one.

$$\begin{cases} \vec{s} \in E_1(\Pi_1(\mathcal{D}_S)) \\ \vec{t} \in E_1(\Pi_1(\mathcal{D}_T)) \\ \vec{s} \prec \vec{t} \\ s_1 = t_1 \\ f_S(\vec{s}) = f_T(\vec{t}) \\ \Theta_{\tilde{S}}((s_2, \ldots, s_n)) \succ \Theta_{\tilde{T}}((t_2, \ldots, t_m)) \end{cases}$$

Finally, because the previous constraints set is empty and a superset of the polyhedron 1, the polyhedron 1 is also guaranteed to be empty. Thus, when applied on PUGRs, the focalisation and defocalisation process is guaranteed to result in legal schedules $\Theta$, provided that the schedules $\Theta\sim$ are legal with regard to the focalized program representation.

Various embodiments of the focalisation operator discussed above are able to reduce the polyhedra dimensionality while preserving the semantics of programs including UGRs and PUGRs. However, some memory references in programs are not PUGRs and cannot benefit substantially from the focalisation operator described above. Embodiments of another focalisation operator that does not require memory references to be PUGRs is discussed herein.

We define a new, more general, focalisation operator $\check{\alpha}_g$ performing the focalisation by projecting away the outermost dimension in $\Delta_{S,T}$:

$$\check{\alpha}_g(\Delta_{S,T}) = \Pi_1(\Delta_{S,T})$$

In the polyhedron 1 discussed above, the schedules $\Theta\sim$ are computed using the focalised program representation. By construction, they are legal with regard to the focalized program dependences. In particular, $\Theta_{\tilde{S}}$ and $\Theta_{\tilde{T}}$ are valid with regard to the dependence $\delta_{S,T}$, after it has been focalized. As a consequence, the following constraint set is guaranteed to be empty, by definition of the schedule legality.

$$\begin{cases} \check{\alpha}_g(\Delta_{S,T}) \\ \Theta_{\tilde{S}}((s_2, \ldots, s_n)) \succ \Theta_{\tilde{T}}((t_1, \ldots, t_m)) \end{cases}$$

We extend the previous constraints set using the extension operator $E_1$. Because the polyhedron extension does not impact the polyhedron vacuity, the following extended constraint set is also empty.

$$E_1\left(\begin{cases} \check{\alpha}_g(\Delta_{S,T}) \\ \Theta_{\tilde{S}}((s_2, \ldots, s_n)) \succ \Theta_{\tilde{T}}((t_1, \ldots, t_m)) \end{cases}\right)$$

Interestingly, the previous set of constraint is both empty and a superset of the polyhedron 1. Therefore, the restored schedules $\Theta_S$ and $\Theta_T$ are legal with regard to the dependence $\delta_{S,T}$ if the schedules $\Theta_{\tilde{S}}$ and $\Theta_{\tilde{T}}$ are also legal in the focalized program representation.

The generalized focalisation operator $\breve{\alpha}_g$ is thus correct even if the considered memory references are not PUGRs. However, it suffers from several limitations that may make its use computationally expensive in a polyhedral compilation toolchain. Indeed, $\breve{\alpha}_g$ is defined over dependence polyhedra and not over access functions and iteration domains, like $\breve{\alpha}$ is. In general, there are significantly more dependence polyhedra than iteration domains in the polyhedral model representation of programs. As such, the $\breve{\alpha}_g$ operator must be applied much more frequently than the $\breve{\alpha}$ operator. It also requires full dependence polyhedra to be built before being focalized, which can be computationally expensive. Moreover, in a modern polyhedral compilation flow, numerous complex optimizations may be applied after scheduling, usually based on iteration domains, and relatively few optimizations are generally applied to the dependence polyhedra. All such compiler passes may not benefit from the focalisation performed on dependence polyhedral. This can reduces the benefits offered by $\breve{\alpha}_g$. Nevertheless, $\breve{\alpha}_g$ still demonstrates how the focalisation process can theoretically be applied safely to any program within the polyhedral model. It also illustrates the flexibility of our framework based on generic operators.

Figure 3A:
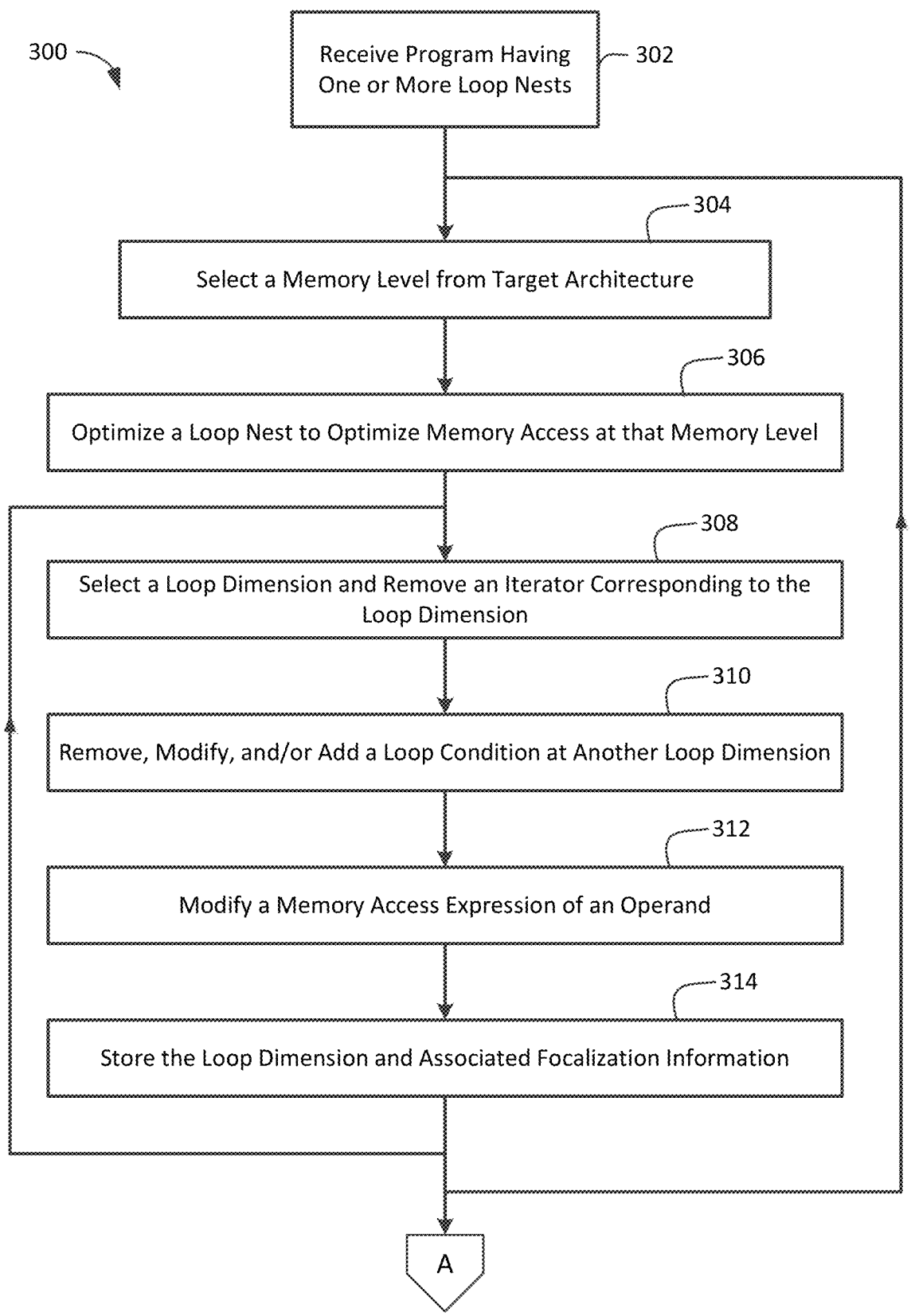
FIGS. 3A and 3B illustrate a focalization/defocalization process, according to various embodiments.
Figure 3B:
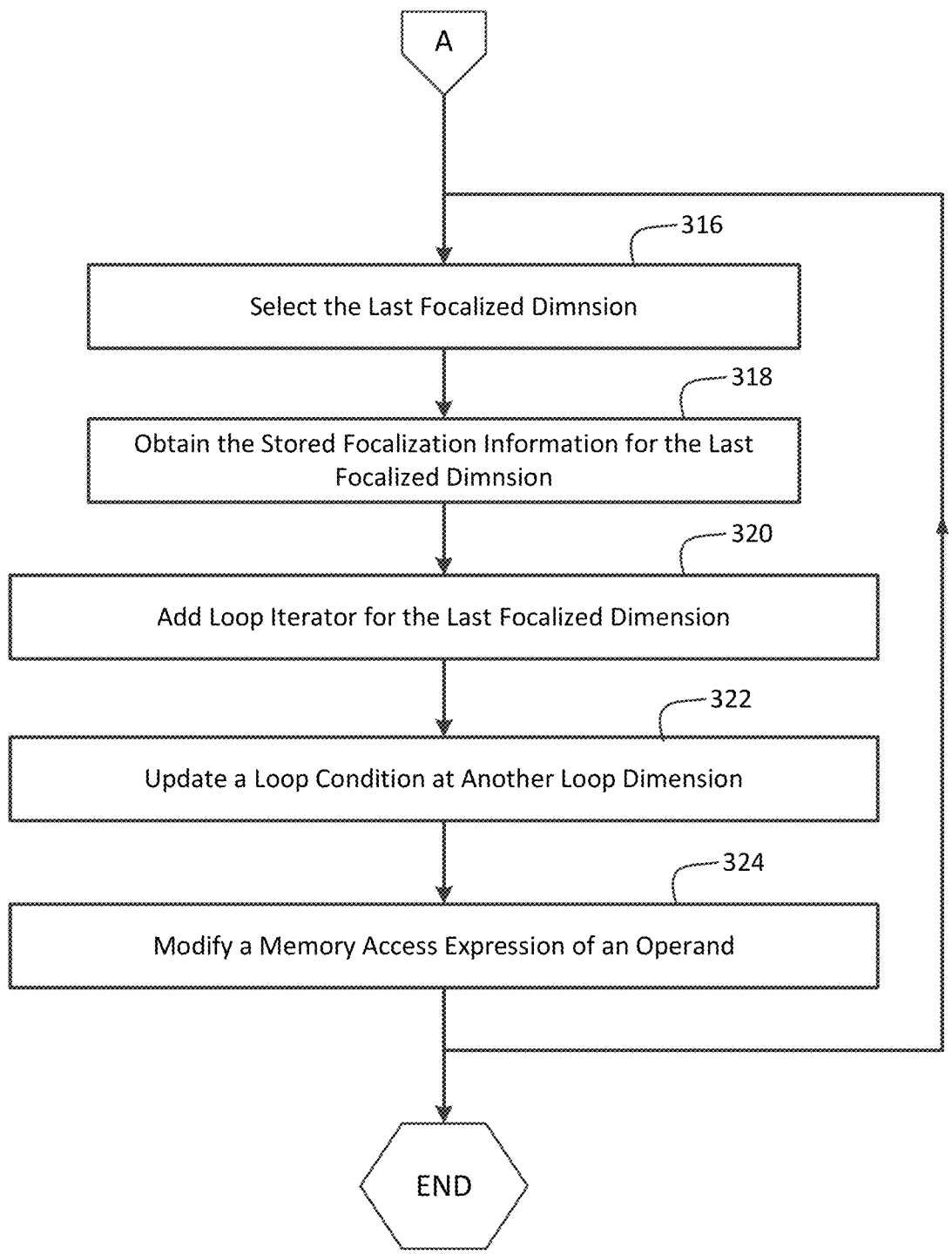

With reference to FIGS. 3A and 3B, in a compilation process 300, a program having one or more loop nests is received at step 302. One or more loop nests may have different dimensions and different numbers of dimensions or depths than the other loop nests. In general the number of dimensions/depth of a loop nest can be any number such as 2, 3, 5, 7, 10, etc. In step 304, a particular memory level from a target architecture is selected. The target architecture may have any number of processor and/or memory levels, such as 1, 2, 3, 5, 8, etc., levels.

In the optional step 306, compiler optimizations such as loop fission, loop fusion, loop interchange, loop unroll, loop jam and unroll, and/or loop reversal, may be performed. Alternatively, or in addition, optimizations such as strip mining and/or loop tiling may be performed. Strip mining and loop tiling can increase the number of dimensions (also called dimensionality or depth) of a loop nest. These optimizations can be based on one or more characteristics of the memory at the selected level, such as memory size, memory speed, the number of read and/or write ports of the memory, memory power consumption, etc. As such, these optimizations may optimize the memory access (in terms of speed, number of memory accesses, power consumed, etc.), at the selected memory level. The optimizations may also focus on one or more loop dimensions while ignoring the other dimensions.

A dimension of the loop nest is selected in step 308. The selected dimension can be an original loop dimension, or a loop dimension added during the optional optimizations performed at step 306. In some embodiments, a loop dimension that is determined not to important for the optimizations to be performed for the next level of memory hierarchy is selected at step 308. A compiler can make this determination. In some embodiments, the outermost loop dimension is selected and/or a dimension at which memory accesses are UGRs or PUGRs may be selected. An iterator corresponding to the selected loop dimension is removed, e.g., using the projector operator discussed above, at step 308.

At the optional step 310, a condition, such as a loop-bound condition, associated with another loop in the loop nest is modified. The modification may include removing a subcondition associated with the dimension selected in step 308, adding a new subcondition, and/or changing a value, such as a constant, that is associated with the loop condition.

Optionally, a memory access expression associated with an operand accessed within the loop nest is modified in step 312. The modification may include removing a reference to the dimension selected in step 308. Accessing an operand as used herein generally means performing a read memory and/or a write memory operation using the operand. The memory access expression may specify the address of the memory location at which the read and/or write operation is performed. Even though both steps 310, 312 are optional, typically at least one of these steps is performed.

In step 314, the selected dimension and the associated focalization information, e.g., the changes to the condition (s) of one or more other loops, and/or modification(s) to the memory access expressions of one or more operands are stored, for later use during defocalization. The steps 308-314 are collectively referred to as focalization that is described above. In some embodiments, the focalization steps 308-314 are repeated one or more times. In each iteration, a different loop dimension may be selected in step 308, and the steps described above may be repeated for that dimension. In various embodiments, after focalization iteration(s) are performed for a selected memory level, another memory level is selected from the target architecture at step 304, and the steps 306-314, each of the steps 306, 310, 312 being optional, may be repeated for the other memory level. These process steps may be iterated for one, some, or all memory levels of the target architecture. During the optional step 306, tiling may be performed. Different loop dimensions may be selected for tiling in different iterations associated with different memory levels. Alternatively, the same loop dimension may be tiled in these different iterations. In the latter case, the same or different tile sizes may be selected in different iterations.

After optimization and focalization are performed at one or more memory levels, defocalization is performed. To this end, in step 316 the last loop dimension that was focalized is selected. In step 318, focalization information that was stored in step 314 for this loop dimension is obtained. Using this information, a loop iterator corresponding to the selected loop dimension is added to the loop nest in step 320. The loop condition(s) associated with one or more other loops in the loop nest may be optionally updated in step 322, using the previously stored information. The update may include removing subcondition(s) associated with the dimension(s) of the loop nest, adding new subcondition(s), and/or changing value(s) associated with the loop condition(s). Memory access expression(s) for one or more operand(s) specified within the loop nest may be optionally modified in step 324. The modification may include adding a reference to the dimension added by adding an iterator in step 320.

The steps 316-324 are collectively referred to as defocalization, and defocalization is generally performed for each loop dimension that was focalized. The focalization/defocalization process may be performed for more than one loop nests in the original program in parallel, or sequentially, or in parallel in part and sequentially, in part.

Example

Consider a loop nest:
for iT=0 to 64
for i=0 to 16
A[16*iT+i]= . . . .
This loop nest can be focalized, for focalizing the loop dimension corresponding to the loop index iT as:

for i=0 to 16
    A[i]= . . . .
Here, the iterator corresponding to the loop index iT is removed (step 308) and memory access expression of the operand A is modified (step 312). In an iteration targeting another memory level, this focalized loop nest is tiled (step 306), and becomes:
    for iT2=0 to 4
    for i2=0 to 4
      A[4*iT2+i2]= . . . .
This final loop nest can be defocalized as follows:
    for iT=0 to 64
    for i=0 to 16
      A[16*iT+i]= . . . .
The step shown above reintroduces the previously focalized loop dimension iT (step 316). The loop dimension i that was tiled, is temporarily introduced. Thereafter, the conditions associated with one or more loops and memory access expression are updated (steps 322, 324) as follows:
    for iT=0 to 64
    for i=0 to 16
    for iT2=0 to 4
    for i2=0 to 4
    A[16*iT+i]= . . . .
Here the tiled dimensions (iT2 and i2) corresponding to the original loop dimension are restated. Thereafter, conditions associated with the loop dimension i2 are updated (step 322).
    for iT=0 to 64
    for i=0 to 16
    for iT2=0 to 4
    for i2=0 to 4 && 0>=4*iT2+i2<16
    A[16*iT+i]= . . . .
The loop dimension i that was temporarily introduced is removed because the dimension i was tiled, introducing new dimensions iT2 and i2, and these new dimensions are now present in the loop nest.
    for iT=0 to 64
    for iT2=0 to 4
    for i2=0 to 4 && 0>=4*iT2+i2<16
    A[16*iT+i]= . . . .
Finally, the memory access expression for the operand A is updated (step 324):
    for iT=0 to 64
    for iT2=0 to 4
    for i2=0 to 4 && 0>=4*iT2+i2<16
    A[16*iT+4*iT2+i2]= . . . .

Experimental Setup

In order to evaluate the presented focalised compilation process, we implemented it in the R-Stream™ compiler, developed by Reservoir Labs. R-Stream™ is a source-to-source polyhedral compiler implementing many modern program optimizations including automatic parallelization, memory management, and explicit communication generation. The scope of the optimizations implemented in R-Stream™, in particular regarding automatic memory management, make of the compiler a relevant candidate for our experiments.

In all the presented experiments, we compare two versions of R-Stream™. Both of them perform hierarchical mapping of the programs over successive levels of the targeted memory and processing hierarchies. As such, a sequence of polyhedral transformations is computed and applied to the programs, successively optimizing the programs for every hierarchy level. The transformations applied to programs include one or more of polyhedral rescheduling, OpenMP parallelization, and tiling. The two evaluated versions of the compiler differ in that one of them applies the focalisation operator on the parts of the program that comply with the operator requirements every time a new hierarchy level is targeted. The version using the focalisation operator thus performed "focalised compilation," while the other version is simply referred to as the "reference" which did not perform focalized compilation.

In order to evaluate a large variety of target platforms, we designed a set of hypothetical hardware targets for the compiler. A first platform has a single processing level made of 64 x86-like processing units with a single 32 KB memory level. Every other machine model is deduced as 4 instances of the highest processing level and by adding a new memory level twice as big as the highest memory level in the reference model. As a result, we designed 5 hierarchical machine models exposing from 1 to 5 processing and memory levels. We believe that such machine models are made of quantities in the same order of magnitude as those expected for exascale machines.

The evaluation has been performed over various programs including the PolyBench/C benchmark suite, and representative kernels extracted from complex programs of interest. We included the Chebyshev smoother from the High Performance Geometric Multi-grid (HPGMG) benchmark, a sparse matrix-matrix multiplication as expressed in the CoSP2 proxy application, two sub-kernels found in space-time adaptive processing (STAP), and a 3D Reverse Time Migration algorithm (RTM-3d). The two kernels extracted from STAP are a covariance estimation using complex numbers, and an Adaptive Matched Filter (AMF) kernel.

All of the compilation experiments have been performed on a standard x86 server made of 4 Intel® Xeon® E5-4620 processors having 32 hyper-threaded processor cores. The server runs Linux 3.13 as provided in Ubuntu 14.04 and exploits gcc 4.8 as a low-level C compiler.

Performance

As a first step in our experiments, we evaluated the performance gains provided by the focalisation and defocalisation operators using two metrics: the compilation time and execution time of the generated parallel programs. For the focalisation process to be determined to be efficient, we evaluated whether the focalisation and defocalisation operators provided measurable speedups during the compilation while not significantly (e.g., less than 20%, 10%, 5%, 2%, 1%, or less) impacting the resulting program performance. Finally, in order to perform a comparison in a fair manner, we considered for this study a shallow hierarchy of 2 levels only. Such shallow hierarchy limits the number of dimensions in polyhedra, which still allows a classical polyhedral compilation flow to work reasonably well. In such configuration, the benefits of the focalisation process are expected to be limited because the operators can only be applied once on the program, typically removing or restoring two or three dimensions on polyhedra.

Figure 4:
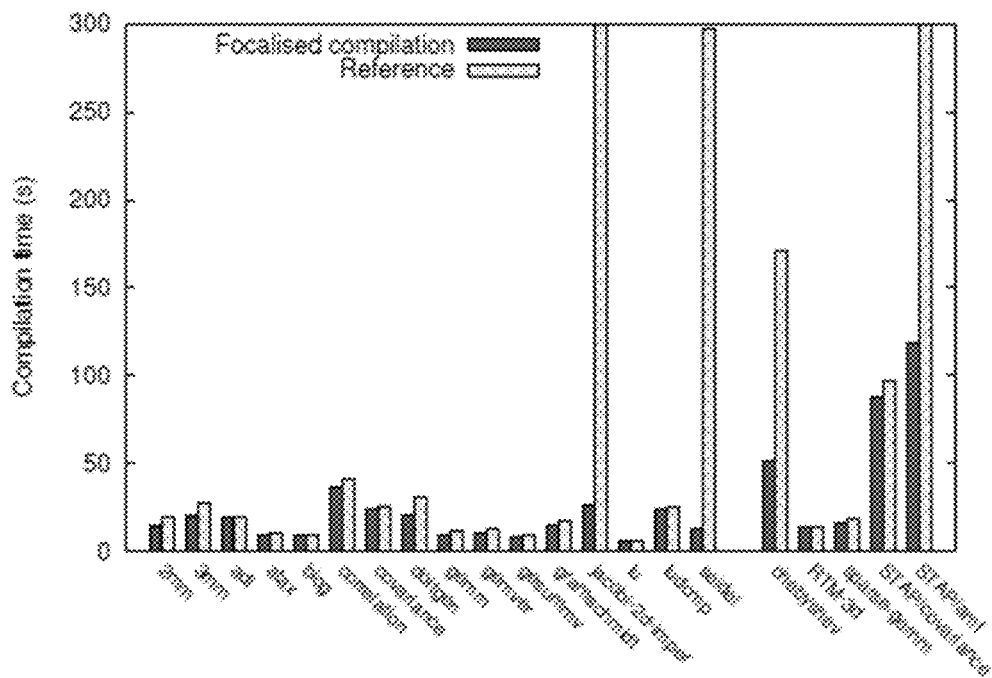
FIGS. 4-8 show comparisons of results obtained without and with the focalization/defocalization operators according to various embodiments.

The effects of the focalisation and defocalisation operators depend on the considered program, as shown in FIG. 4. First, some programs do not allow the operator to be applied because they cannot be decomposed into loop nests only made of PUGRs. A typical example of such program is the lu kernel which contains several non-uniform dependences. For several other programs, however, the compilation time can be drastically reduced due to the focalisation process. The programs that benefit the most from the focalisation may include deep loop nests and may include a large number of PUGRs. The kernels jacobi-2d-imper and STAP/amf are cases for which the reference compiler is not able to optimize the program in less than 5 minutes and is then terminated. For those two programs, the focalized compilation flow terminates successfully in a few seconds. The kernel seidel is another similar case, although the reference compiler ends just before the 5 minutes timeout. From the experiments, it can be observed that the focalisation operator, when it can be applied, significantly (e.g., by 10%, 20%, 35%, 50%, 70%, 90%, etc.) reduces the time required to optimize a program.

Figure 5:
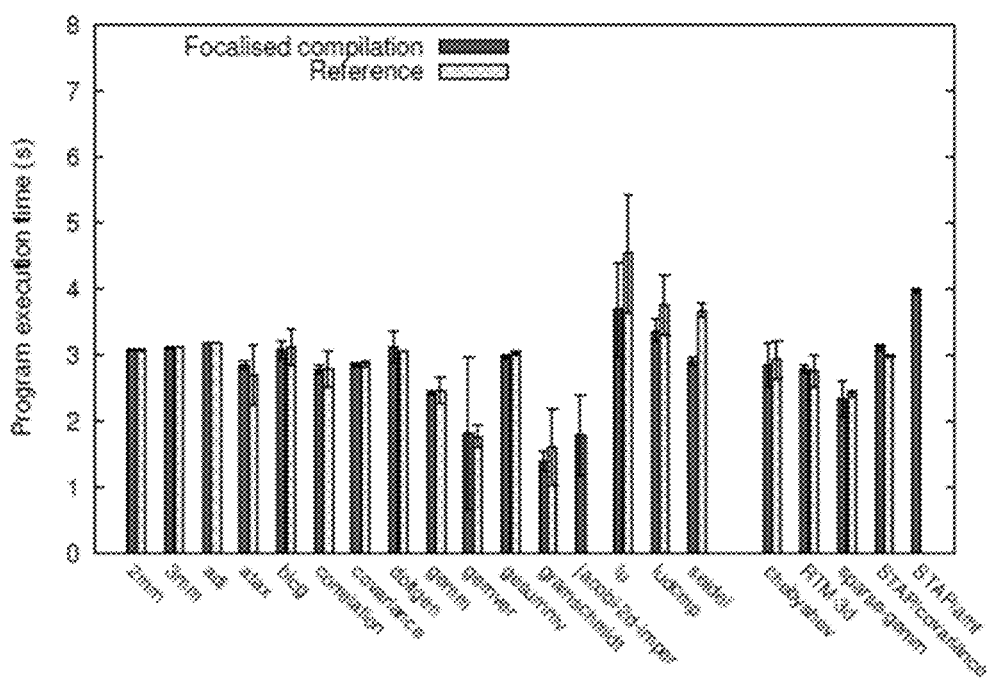

Although we observed reduced compilation times, it was also worth checking that the resulting programs still provide similar performance compared to the reference compilation flow, when it can compile a program. The parallel programs generated by the exact and focalised compilation flows are compared in FIG. 5. No data is provided for jacobi-2d-imper and STAP/amf with the reference compilation flow because no compiled program was generated in a realistic time (e.g., in up to 5 min) when the focalisation operator was not used. FIG. 5 shows that the focalised compiler managed to produce comparably efficient parallel code in all the cases. In general, the loss of parallelization due to the application of the focalization was not more than 0.1%, 0.5%, 1%, 5%, 10%, 20%, etc.

The execution time fluctuations for lu and ludcmp can be ignored and are likely due to measurement noise. However, for seidel, the focalised compilation flow generated a significantly better compiled program. Such surprising result can generally be explained from two reasons. First, compilers use many heuristics and models to determine the transformations to apply on a program. Because of those approximations, compilers are generally sensitive to the program representation and may apply different transformations when the program representation changes. For instance, R-Stream™ searches for optimal tile sizes using a genetic algorithm, which produces slightly different tile sizes for seidel when focalised compilation is used. Second, polyhedral compiler usually rely on solvers to determine which optimization to apply to a program. The solvers used may not be able to reach an optimal solution with larger program representations when a strict time constraint is imposed by the compiler. Because the focalised representation creates simpler problems for the solvers, they can reach better solutions within the time constraints, which ultimately results in better programs. Thus, even though the focalised compilation flow is not intended to improve the generated programs, it may induce some beneficial side effects in the compiler by simplifying the problems solved during compilation, in particular if a time constraint is enforced on the solvers.

Scalability

Additionally to the raw performance, we also evaluated the impact of the focalisation operator on the compiler scalability. The compiler scalability is evaluated by recompiling a given program using increasingly deeper hardware hierarchies as a target. In our experiments, we evaluated processor and memory hierarchies with 1 to 5 levels. Among the benchmark programs, we selected 3 representative cases leading to different scalability patterns. These three cases are discussed below.

Figure 6:
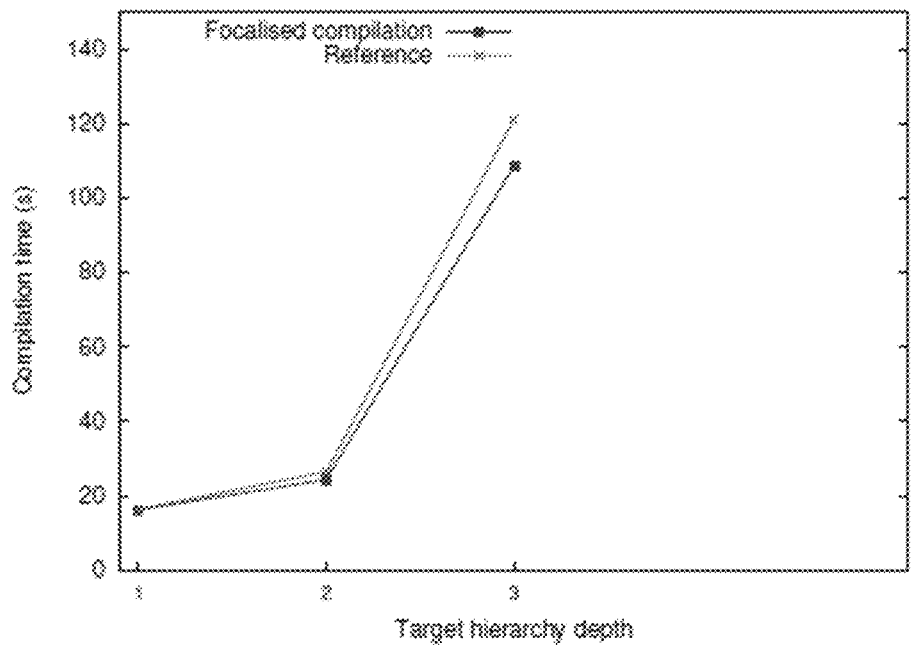

The first program whose scalability was studied is covariance. In this program, only a small subset of the program includes PUGRs. Therefore, the focalisation operator was not expected to perform well. It can be seen from FIG. 6 that a slight improvement in the compilation time was achieved when considering hierarchies of 2 and 3 levels. However, the improvement was insufficient to target 4 or more levels. As a result, both the reference compilation flow and the focalised one reach the 5 minutes timeout limit without producing an optimized program.

Figure 7:
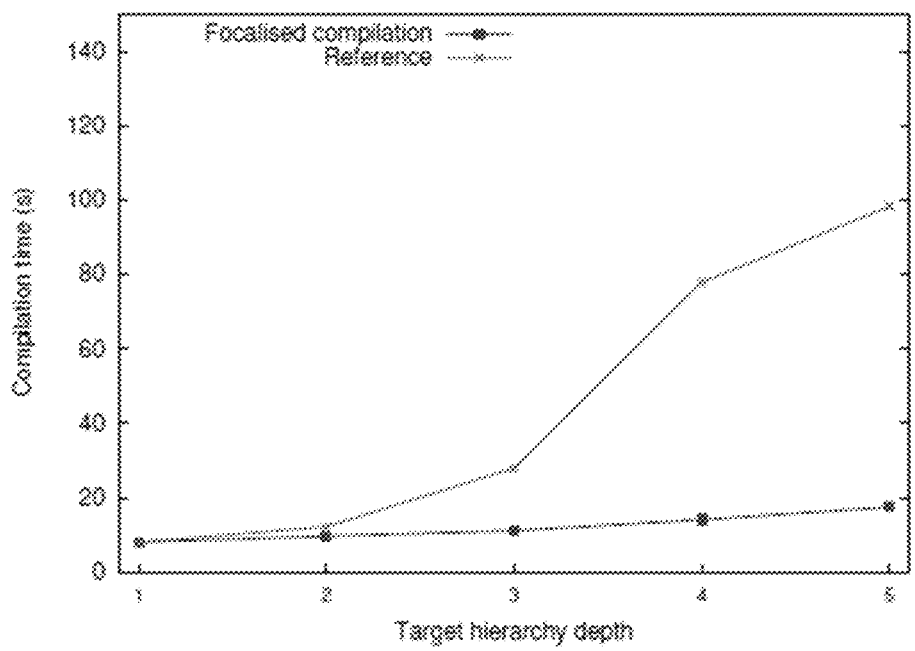

A second case is presented in FIG. 7 with the gemm kernel. For this kernel, both compilers managed to parllelize and optimize the program in less than 5 minutes. However, the focalised compilation flow provides a clear improvement over the reference as soon as at least 3 hierarchy levels are targeted. gemm is a good candidate for the focalization operator because it generally includes UGRs.

Figure 8:
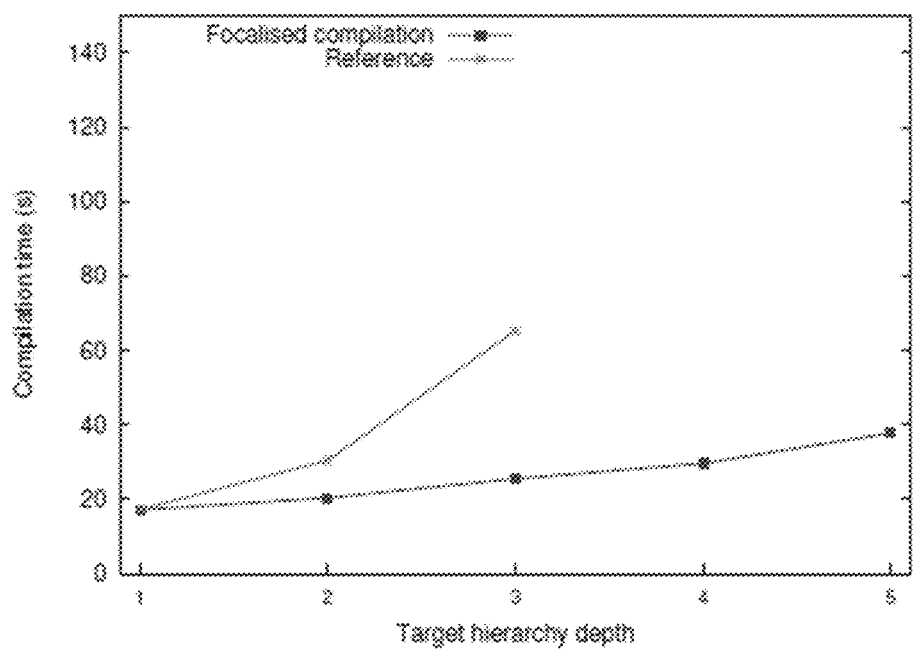

The third studied kernel, doitgen, has a similar scalability trend as gemm, as shown in FIG. 8. However, with doitgen, not only the focalisation operator improves the compilation time but it also allows the compiler to produce a parallel program in all the studied cases whereas the hierarchies with 4 or more levels are out of reach when the focalisation operator is not used. This example illustrates the importance of the focalisation operator when targeting deep hardware hierarchies: it effectively provides the significant scalability improvement required to target the next hardware generation.

Various improvement techniques described in the background generally target different sources of computational inefficiencies, but do not tackle the difficulties induced by the polyhedra dimensionality, that can be addressed by the focalisation and defocalisation operators. As such, these other approaches are orthogonal to ours and can be used together with various embodiments described herein to reduce further the computational complexity. Moreover, although the focus of our approach is on the number of dimensions in polyhedra, the presented operators also have positive side effects on the number of constraints in the internal representation.

Unlike parametric tiling, the focalisation and defocalisation operators allow the tiled program to be efficiently represented while maintaining the polyhedral representation of the program. Therefore, a tiled program can be further optimized and modified after tiling using various techniques described herein.

We have presented two new operators in the context of the polyhedral model: a focalisation operator and a defocalisation operator. The focalisation operator is also specialized for program regions made of piecewise uniformly generated memory references. We have demonstrated the preservation of the program semantics during the focalisation and defocalisation process for both the general and specialized version of the operators. As a result, we have provided a safe and sound methodology for significantly reducing (e.g., by 10%, 20%, 50%, an order of magnitude, or even more) the computational cost of program optimization. Our experiments illustrate that the focalisation operator can significantly (e.g., by 10%, 20%, 50%, an order of magnitude, or even more) improve the compiler performance and/or scalability. The focalisation process is a major asset for optimizing compilers that enables them to realistically target the next-generation hardware.

In summary, computers across the board, from embedded to future exascale computers, are consistently designed with deeper memory hierarchies. While this opens up exciting opportunities for improving software performance and energy efficiency, it also makes it increasingly difficult to efficiently exploit the hardware. Advanced compilation techniques are a possible solution to this difficult problem and, among them, the polyhedral compilation technology provides a pathway for performing advanced automatic parallelization and code transformations. However, the polyhedral model generally has poor scalability with respect to the number of dimensions in the polyhedra that are used for representing the programs to be compiled and executed. Although some compilers can cope with such limitation when targeting shallow hierarchies, polyhedral optimizations often become intractable as soon as deeper hardware hierarchies of the modern processing system architecture are considered.

We address this problem at least in part by introducing two new operators for polyhedral compilers: focalisation and defocalisation. When applied in the compilation flow, the focalization operator generally reduces the dimensionality of polyhedra, which can significantly simplify the optimization problems solved during the compilation. We prove that the presented operators preserve the original program semantics, allowing them to be used safely in compilers.

Unlike any generic operations such as parsing, etc., unlike usual computer functions such as storage and access of information, and unlike any ordinary mathematical or mental processes such as comparing and categorizing information, the unconventional operations involved in various compilation techniques involving focalization and defocalization, as described herein, are specifically orchestrated. Specifically, various embodiments of the focalization/defocalization methods and system involve analysis of the physical properties of the processing system having a memory hierarchy. These properties include memory speed, bandwidth, size, etc., and the focalization operator allows compiler optimizations to be targeted for each memory level in the hierarchy. Such a compilation involving these uncommon and unconventional operations can improve not only the operation of a computer used for compilation, but also the operation of a target system used to execute the compiled program.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for optimizing execution of a program by a processing system comprising a hierarchical memory having a plurality of memory levels, the method comprising:
   (a) for each memory level in at least a subset of memory levels in the plurality of memory levels focalizing a loop dimension of a selected loop nest within a program, the loop nest having a nesting level of N, N being greater than 1, focalizing comprising:
      removing an iterator corresponding to a loop index associated with the loop dimension being focalized, reducing the nesting level to N−1;
      in the loop nest having the reduced nesting level, at least one of:
         (i) removing from a loop condition at another loop dimension of the selected loop nest a subcondition corresponding to the loop index; and
         (ii) removing from a memory access expression of an operand, a reference to the loop index; and
      storing the loop index and associated focalization information for that memory level; and
   (b) for each focalized dimension, defocalizing that dimension by:
      adding an iterator based on a reintroduced loop index associated with the loop dimension being defocalized; and
      at least one of:
         updating a loop condition at another loop dimension of the selected loop nest based on the stored focalization information associated with the loop dimension being defocalized; and
         updating the memory access expression of the operand based on the reintroduced loop index and the stored focalization information.

2. The method of claim 1, further comprising at least one of: (i) tiling the selected loop nest, and (ii) strip mining the selected loop nest, to optimize memory access associated with an operand accessed within the selected loop nest, at that memory level.

3. The method of claim 1, wherein the focalization information comprises at least one of a loop bound and a tile size.

4. The method of claim 1, wherein:
a first dimension is focalized at a first memory level; and a second dimension different from the first dimension is focalized at a second memory level.

5. The method of claim 1, wherein:
a first dimension is focalized at a first memory level; and the first dimension is also focalized at a second memory level.

6. The method of claim 5, wherein:
a first tile size is associated with the first dimension at the first memory level; and
a second tile size different from the first tile size is associated with first dimension at the second memory level.

7. The method of claim 1, wherein the loop dimension being focalized is at least one of: (i) the outer-most dimension of the selected loop nest, (ii) a dimension in which memory accesses are piecewise uniformly generated references (PUGRs), and (iii) a dimension in which memory accesses are uniformly generated references (UGRs).

8. The method of claim 1, further comprising performing for at least one memory level at least one loop-nest transformation prior to the focalizing step, the loop-nest transformation being selected from the group consisting of loop fission, loop fusion, loop interchange, loop unroll, loop jam and unroll, loop reversal, strip mining, and loop tiling.

9. The method of claim 1, wherein a characteristic of memory at a first memory level is different from the characteristic of memory at a second memory level, the characteristic being selected from the group consisting of memory size, memory speed, and memory power consumption.

10. The method of claim 1, further comprising:
determining that all memory access within a candidate loop nest are PUGRs or UGRs; and
selecting the candidate loop nest as the selected loop nest.

11. The method of claim 1, further comprising:
generating a set of schedule constraints prior to performing the focalizing step; and
testing a violation of the schedule constraints after at least one defocalization step.

12. A system for facilitating optimized execution of a program by a processing system comprising a hierarchical memory having a plurality of memory levels, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
(a) for each memory level in at least a subset of memory levels in the plurality of memory levels, focalize a loop dimension of a selected loop nest within a program, the loop nest having a nesting level of N, N being greater than 1, wherein to focalize the loop dimension the instructions program the processing unit to:
remove an iterator corresponding to a loop index associated with the loop dimension being focalized, reducing the nesting level to N−1;
in the loop nest having the reduced nesting level, at least one of:
(i) remove from a loop condition at another loop dimension of the selected loop nest a subcondition corresponding to the loop index; and
(ii) remove from a memory access expression of an operand, a reference to the loop index; and
store the loop index and associated focalization information for that memory level; and (b) for each focalized dimension, defocalize that dimension, wherein to defocalize the dimension the instructions program the processing unit to:
add an iterator based on a reintroduced loop index associated with the loop dimension being defocalized; and
at least one of:
update a loop condition at another loop dimension of the selected loop nest based on the stored focalization information associated with the loop dimension being defocalized; and
update the memory access expression of the operand based on the reintroduced loop index and the stored focalization information.

13. The system of claim 12, wherein the instructions further program the processing unit to, at least one of: (i) tile the selected loop nest, and (ii) strip mine the selected loop nest, to optimize memory access associated with an operand accessed within the selected loop nest, at that memory level.

14. The system of claim 12, wherein the focalization information comprises at least one of a loop bound and a tile size.

15. The system of claim 12, wherein the instructions program the processing unit to:
focalize a first dimension at a first memory level; and
focalize a second dimension different from the first dimension at a second memory level.

16. The system of claim 12, wherein the instructions program the processing unit to:
focalize a first dimension at a first memory level; and
focalize the first dimension also at a second memory level.

17. The system of claim 16, wherein:
a first tile size is associated with the first dimension at the first memory level; and
a second tile size different from the first tile size is associated with first dimension at the second memory level.

18. The system of claim 12, wherein the loop dimension being focalized is at least one of: (i) the outer-most dimension of the selected loop nest, (ii) a dimension in which memory accesses are piecewise uniformly generated references (PUGRs), and (iii) a dimension in which memory accesses are uniformly generated references (UGRs).

19. The system of claim 12, wherein the instructions program the processing unit to perform for at least one memory level at least one loop-nest transformation prior to the focalization operation, the loop-nest transformation being selected from the group consisting of loop fission, loop fusion, loop interchange, loop unroll, loop jam and unroll, loop reversal, strip mining, and loop tiling.

20. The system of claim 12, wherein a characteristic of memory at a first memory level is different from the characteristic of memory at a second memory level, the characteristic being selected from the group consisting of memory size, memory speed, and memory power consumption.

21. The system of claim 12, wherein the instructions further program the processing unit to:
determine that all memory access within a candidate loop nest are PUGRs or UGRs; and
select the candidate loop nest as the selected loop nest.

22. The system of claim 12, wherein the instructions further program the processing unit to:
generate a set of schedule constraints prior to performing the focalization operation; and
test a violation of the schedule constraints after at least one defocalization operation.

* * * * *

UNITED STATES PATENT AND TRADEMARK OFFICE
CERTIFICATE OF CORRECTION

| | |
|---|---|
| PATENT NO. | : 10,789,055 B2 |
| APPLICATION NO. | : 15/285810 |
| DATED | : September 29, 2020 |
| INVENTOR(S) | : Muthu Manikandan Baskaran et al. |

It is certified that error appears in the above-identified patent and that said Letters Patent is hereby corrected as shown below:

In the Specification

At Column 1, Line 16, under the heading "STATEMENT OF GOVERNMENT SUPPORT" is corrected to read as follows:
-- This invention was made with government support under Contract No. HR0011-12-C-0123 awarded by Defense Advanced Research Projects Agency (DARPA). The government has certain rights in the invention. --

Signed and Sealed this
Sixteenth Day of May, 2023

Katherine Kelly Vidal
*Director of the United States Patent and Trademark Office*